US006397767B1

United States Patent
Dietrich, Sr.

(10) Patent No.: US 6,397,767 B1
(45) Date of Patent: Jun. 4, 2002

(54) KNIFE APPLICATOR FOR APPLYING LIQUID FERTILIZER IN THE GROUND

(75) Inventor: William J. Dietrich, Sr., Goodfield, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/775,055

(22) Filed: Feb. 1, 2001

(51) Int. Cl.[7] ............................................... A01C 23/02
(52) U.S. Cl. ........................ 111/119; 111/123; 111/156
(58) Field of Search .............................. 111/149, 152, 111/153, 156, 119, 118, 120, 123, 124, 7.1; 172/721, 722, 723, 724, 725, 726, 730, 732, 733

(56) References Cited

U.S. PATENT DOCUMENTS

| 2,439,743 A | 4/1948 | McEwen ....................... 97/78 |
| 2,598,121 A | 5/1952 | Hannibal ....................... 111/7 |
| 2,619,054 A | 11/1952 | Bell ............................... 111/7 |
| 2,660,939 A | 12/1953 | Pool et al. ................. 97/47.42 |
| 2,684,617 A | 7/1954 | Johnston ....................... 97/78 |
| 2,842,077 A | 7/1958 | Morrison ....................... 111/7 |
| 2,849,969 A | 9/1958 | Taylor ........................... 111/7 |
| 2,874,656 A | 2/1959 | Bennett ......................... 111/7 |
| 3,170,421 A | 2/1965 | Norris et al. ................... 111/1 |
| 3,188,989 A | 6/1965 | Johnston ....................... 111/7 |
| 3,237,577 A | 3/1966 | Wilkins ......................... 111/7 |
| 3,259,087 A | 7/1966 | Horton .......................... 111/7 |
| 3,296,985 A | 1/1967 | Shelton ......................... 111/7 |
| 3,605,657 A | 9/1971 | Brannan ........................ 111/7 |
| 3,618,538 A | 11/1971 | Brannan ........................ 111/7 |
| 3,854,429 A | 12/1974 | Blair ............................. 111/7 |
| 3,919,951 A | 11/1975 | Williams et al. ............... 111/7 |
| 4,132,181 A | 1/1979 | Smith et al. ................... 111/7 |
| 4,201,142 A | 5/1980 | Stump .......................... 111/7 |
| 4,337,712 A | 7/1982 | Michalko ....................... 111/7 |
| 4,355,589 A | 10/1982 | Wetmore ....................... 111/7 |
| 4,592,294 A | 6/1986 | Dietrich, Sr. et al. .......... 111/7 |
| 4,616,580 A | 10/1986 | Moore et al. .................. 111/7 |
| 4,628,839 A | 12/1986 | Edmisson ...................... 111/7 |
| 4,711,187 A | 12/1987 | Schultz ......................... 111/7 |
| 4,719,862 A | 1/1988 | Edmisson ...................... 111/7 |
| 5,452,673 A | 9/1995 | Bruce ......................... 111/119 |
| 6,095,065 A | 8/2000 | Dietrich, Sr. ............... 111/121 |

Primary Examiner—Christopher J. Novosad

(57) ABSTRACT

A knife applicator is provided for a tillage implement to apply liquid fertilizer into the ground. The knife applicator is formed as a base member with a point member welded to the forward edge thereof to create a furrow when moved through the ground. A fertilizer tube is positioned rearwardly of the base member to deliver liquid fertilizer into the opened furrow. The point member is formed in a rounded tip that presents a smooth rounded surface that fractures and lifts the soil effectively to create the opened furrow. A raised member on the point member assists in the lifting of soil from the furrow being opened while creating only a minimal disturbance to the surface of the ground. A wedge member having a lowered operative edge seals the opened furrow to prevent the liquid fertilizer from escaping into the air.

20 Claims, 3 Drawing Sheets

KNIFE APPLICATOR FOR APPLYING LIQUID FERTILIZER IN THE GROUND

BACKGROUND OF THE INVENTION

This invention relates generally to a non-rotary tool for injecting a fluid fertilizer composition, such as anhydrous ammonia, into a furrow in the ground. More particularly, this invention relates to a fertilizer knife for preparing a furrow in the ground and for directing the fertilizer into the furrow below ground level.

The application of liquid fertilizer over the surface of the ground has been known for many years, but has been found to be unsatisfactory because the fertilizer penetrates the surface of the soil relatively slowly resulting in part of the fertilizer evaporating before it is taken up by the soil. Subsequent rainfall washes much of the remaining fertilizer away. To overcome these problems, deep placement of liquid fertilizer has been carried out and has been found to be beneficial to plant growth.

In recent years, strip-till has become an accepted tillage practice. In order to do strip-till a fertilizer applicator or toolbar is equipped with shanks at the same spacing and number that the farmer has on his corn planter. The farmer, for example, has a corn planter with 12, 30" rows, he will equip a toolbar shanks and knives on 12, 30" centers. This toolbar will then be equipped with markers so that the farmer can go out in the fall of the year and apply the fertilizer and drive accurately because he will be laying out the location of the following years crop rows.

When the crop is planted the following year over these strips all of the seeds are placed in the tilled soil and the remainder of the soil between the rows is not tilled, hence the name strip-till.

Earth penetrating tools and applicator blades have been devised for distributing liquid fertilizer in a desired pattern at various depths below the surface of the soil. Fertilizer distributors of this type have one or more cultivator blades that are drawn through the soil by a tractor. Each blade is provided with a tube extending down the rearward edge for conducting the liquid fertilizer to the lower end of the blade for injection in the soil. The blades are usually provided with a supporting shank secured to a lift-type cultivator drawbar. With such previous knives, such as wedge shaped knives, the soil is parted laterally or sideways resulting in significant landside drag. Some fertilizer knives with a leading edge similar to an upside down "T", causes major soil disruption and high draft loads.

With farm size growing the necessity of covering more acres quickly a lower draft load is desired when using a fertilizer knife. This invention provides an improvement designed to fracture and lift the soil. The new design efficiently breaks and lifts the soil. This forms an opening for injecting the fluid fertilizer composition into a furrow in the ground. The fracture and lift of soil allows for elimination of the compaction layer and will give the seed an appropriately prepared seedbed, for strip till where the crop is planted in the knife paths. This invention is an improvement to the fertilizer knife to lessen landside drag, reducing wear and drag. In addition, this invention allows for minimal disturbance at the soil surface.

SUMMARY OF THE INVENTION

It is an object of this invention to overcome the aforementioned disadvantages of the prior art by providing an improved knife applicator for applying liquid fertilizer into the ground.

It is yet another object of this invention to provide a knife applicator to provide a furrow in the ground and for directing fertilizer into the furrow below ground level using the fertilizer knife of this invention.

It is an advantage of this invention that lower draft loads and less disruption of the soil is achieved.

In accordance with the first embodiment of the invention, a knife applicator used on a tillage implement to apply fertilizer into the ground includes an upper mounting portion adapted for mounting on a shank member of the tillage implement which is removable. A lower furrow making portion includes a lower leading edge having a rounded tip to glide through the ground beneath the surface to lift soil upwardly and outwardly in the creation of the a furrow. A generally vertical leading edge extends upwardly from the lower leading edge to the upper mounting portion. A raised member on the generally vertical leading edge to provide further lifting of the soil. A fertilizer tube is positioned behind the upper mounting portion and terminates at an end positioned above the lower leading edge to place fertilizer into the ground behind the lower leading edge.

The knife applicator may be configured to have a wedge member having wings positioned on opposing sides of the fertilizer tube to engage soil raised by the lower furrow making portion and forces the raised soil downwardly to seal the fertilizer within the soil.

The lower leading edge may extend rearwardly from the lower leading edge to terminate adjacent to the end of the fertilizer tube to form a dirt shield preventing soil from entering into the end of the fertilizer tube.

In accordance with the second embodiment of the invention, a knife applicator for a tillage implement to apply fertilizer into the ground includes an upper mounting portion adapted for mounting on a shank member of the tillage implement to be removable. A lower furrow making portion includes a lower leading edge having a rounded tip to glide through the ground beneath the surface thereof to lift soil upwardly and outwardly in the creation of a furrow. A generally vertical leading edge extends upwardly from the lower leading edge to the upper mounting portion. A fertilizer tube is positioned behind the upper mounting portion and terminates at an end positioned above the lower leading edge to place fertilizer into the ground behind the lower leading edge. A wedge member has wings positioned on opposing sides of the fertilizer tube to engage soil raised by the lower furrow making portion and moves the raised soil downwardly to seal the fertilizer within the soil.

In accordance with the third embodiment of the invention, a knife applicator for a tillage implement to apply fertilizer into the ground includes an upper mounting portion adapted for mounting on a shank member of the tillage implement to be removable. A lower furrow making portion includes a lower leading edge having a rounded tip to glide through the ground beneath the surface thereof to lift soil upwardly and outwardly in the creation of a furrow and a generally vertical leading edge extending upwardly from the lower leading edge to the upper mounting portion. A fertilizer tube is positioned behind the upper mounting portion and terminates at an end positioned above the lower leading edge to place fertilizer into the ground behind the lower leading edge. The lower leading edge extends rearwardly to terminate adjacent to the end of the fertilizer tube to form a dirt shield preventing soil from entering into the end of the fertilizer tube.

These and other objects, features and advantages are accomplished according to the instant invention by providing a knife applicator for a tillage implement to apply liquid fertilizer into the ground. The knife applicator is formed as a base member with a point member welded to the forward edge thereof to create a furrow when moved through the ground. A fertilizer tube is positioned rearwardly of the base member to deliver liquid fertilizer into the opened furrow. The point member is formed in a rounded tip that presents a smooth rounded surface that fractures and lifts the soil effectively to create the opened furrow. A raised member on the point member assists in the lifting of soil from the furrow being opened while creating only a minimal disturbance to the surface of the ground. A wedge member having a lowered operative edge seals the opened furrow to prevent the liquid fertilizer from escaping into the air.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a left front perspective view of a knife applicator for a tillage implement incorporating the principles of the instant invention and being used to apply liquid fertilizer into the ground;

DETAILED DESCRIPTION OF THE PREFERRED EMBODIMENT

Figure 2:
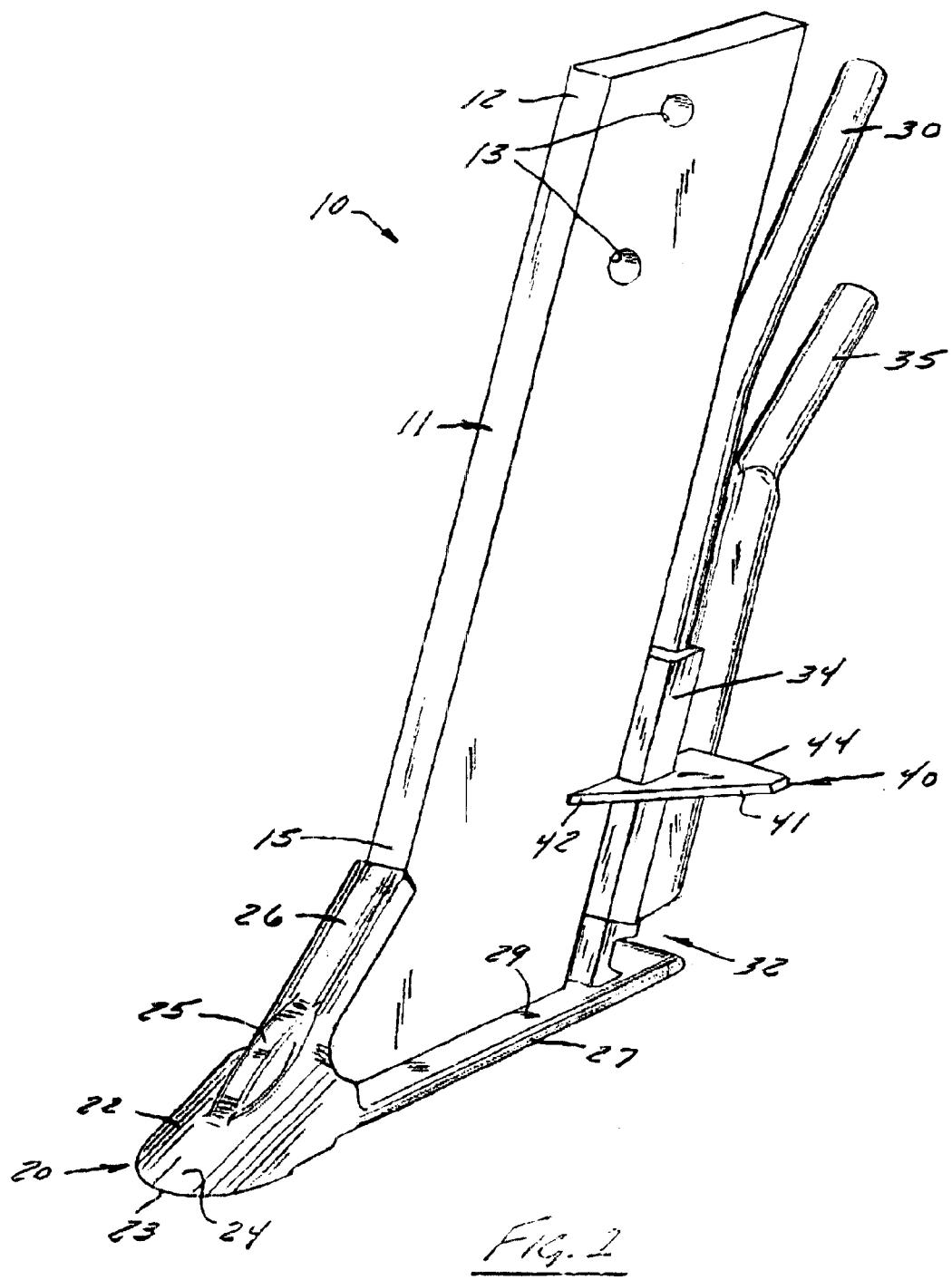
FIG. 2 is a left side elevational view of the knife applicator shown in FIG. 1.
Figure 2:
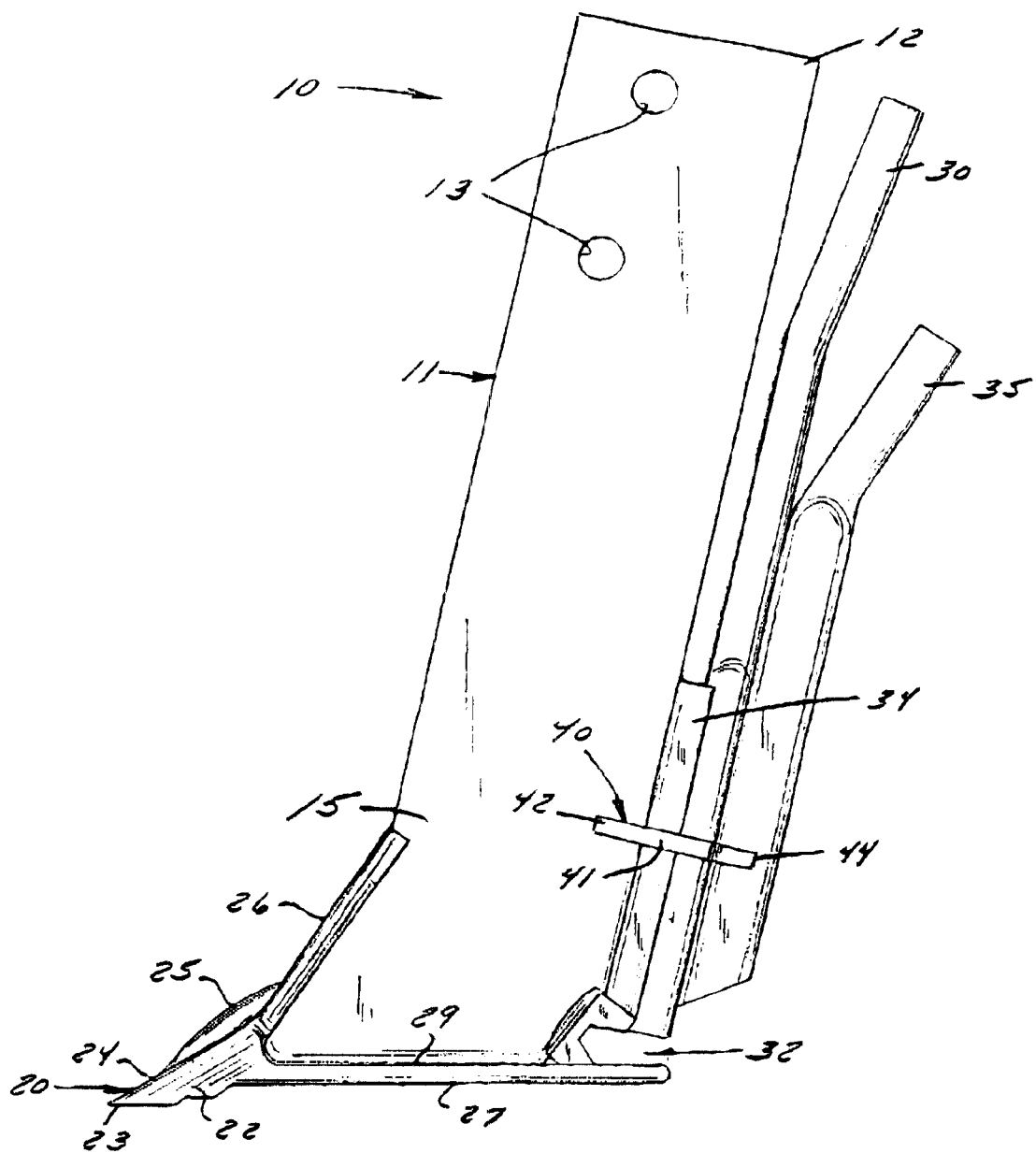
Figure 3:
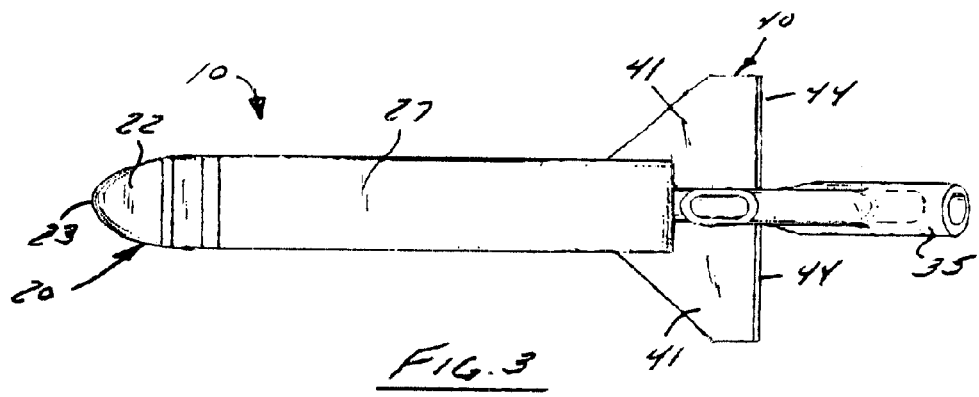
FIG. 3 is a bottom plane view of the knife applicator shown in FIG. 1.
Figure 4:
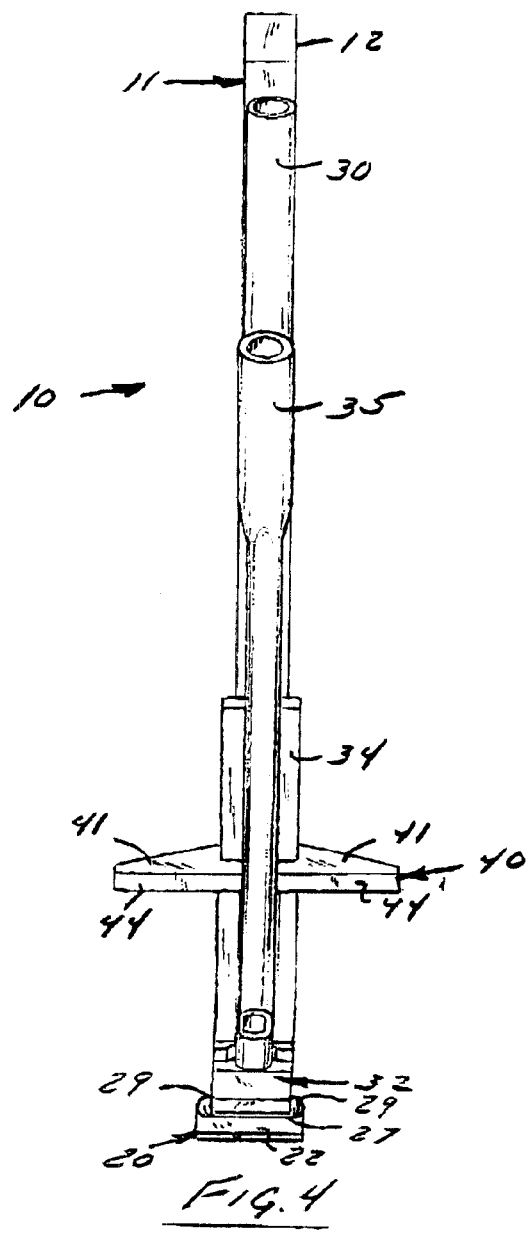
FIG. 4 is a rear elevational view of the knife applicator shown in FIG. 1.

Referring now to the drawings, a knife applicator incorporating the principles of the instant invention can be seen. Any left and right references are used as a matter of convenience and are determined by standing at the rear of the device looking into the forward direction of travel. The knife applicator 10 is typically mounted on a tillage implement (not shown) for insertion into the ground to create a furrow therein for the application of liquid fertilizer into the ground. The tillage implement, also known as a toolbar, is well known in the art and is normally connected to a tractor (not shown) or other prime mover for motive power to insert the knife applicator 10 into the ground and to pull the knife applicator through the ground.

The knife applicator 10 includes a base member 11 including an upper mounting portion 12 that is adapted for connection to a shank member (not shown) by connectors passing through holes 13 formed in the upper mounting portion 12. The base member 11 also includes a lower furrow making portion 15 that is provided with a point member 20 welded to the lower forward portion of the furrow making portion 15 of the base member 11. The point member 20 is formed with a forwardly projecting member 22 that terminates at a forward leading edge 23 forming a rounded tip 24 that is moved through the ground to form a furrow therein. This rounded tip 24 defines a smooth, rounded surface that moves through the ground to fracture and lift the soil to create an opened furrow. When used for strip-till this fracture and lifting of the soil allows for elimination of a compaction layer in the soil and will give seed an appropriately prepared seed bed for effective germination of the seed.

The point member 20 is also formed with a raised member 25 extending upwardly and rearwardly from the rounded tip 24 to a support portion 27 welded to the lower furrow making portion 15 of the base member 11. The raised member 25 is narrower in width than the rounded tip 24 to facilitate the flow soil around the point member and serves to lift the soil to lessen landside drag, thereby reducing wear and tear on the knife applicator 10. The raised member 25 provides for minimal lifting of the soil and only minimal disturbance of the surface of the ground. The flat upward sloping portion of 26 further lifts soil to lessen landside drag. The point member 20 further includes a pair of rearwardly extending dirt shields 29 that extend as a continuation of the leading edge 23 to terminate adjacent the discharge end 32 of the fertilizer tube 30. The dirt shields 29 serve to prevent the displaced soil from traveling upward into the discharge end 32 of the fertilizer tube 30 and clogging the tube 30.

Positioned rearwardly of the base member 11 to gain protection therefrom, the fertilizer tube 30 extends downwardly from a supply of material (not shown), such as liquid fertilizer or anhydrous ammonia, carried on the tillage implement (not shown) to terminate at a discharge end 32 positioned above the dirt shields 29. A channel 34 is welded to the rearward vertical edge of the base member 11 to surround the fertilizer tube 30 for further protection thereof during operation of the knife applicator 10 moving through the soil. An optional seed delivery tube 35 can be mounted to the knife applicator 10 rearwardly of the fertilizer tube 30 to deliver seeds into the furrow formed by the point member 20 as the knife applicator 10 is moved through the soil.

A wedge member 40 is welded to the lower furrow making portion 15 and extends rearwardly therefrom to encompass the channel 34 and the fertilizer tube 30. The wedge member 40 has a shape that is formed with wings 41 that increases in width from a forward attachment point 42 to a rearward operative edge 44. The wedge member 40 serves as a sealer to keep the liquid fertilizer within the furrows formed by the point member 20 by closing the opening created by the rounded tip 24. The wedge member 40 is oriented in an angled configuration with the rearward operative edge 44 being lower than the attachment point 42. The wedge member 40, therefore, operates to compact slightly the displaced soil rearward of the fertilizer tube 30 immediately after the placement of the liquid fertilizer into the opened furrow. This sealing of the opened furrow further prevents the escape of liquid fertilizer into the air, but is particularly necessary for more gaseous materials, such as anhydrous ammonia.

In operation, the knife applicator 10 is inserted into the ground so that the point member 20 is moved through the soil beneath the surface of the ground. The point member 20 creates a small furrow through the passage of the rounded tip 24 through the soil. The raised member 25 assists in lifting soil upwardly and outwardly to help form the small furrow. The raised member 25 is intended to create only a minimal disturbance of the surfaced of the ground as the knife member 20 is moved forwardly. The dirt shield 29 also deflects the displaced soil away from the discharge end 32 of the fertilizer tube 30 to prevent any clogging of the fertilizer tube 30. Liquid fertilizer or other materials are placed into the opened furrow through the fertilizer tube 30 at application rates defined by the operation of the tillage implement (not shown) in known manner. The rearward operative edge 44 of the rearwardly extending wedge member 40 compresses the soil immediately rearwardly of the fertilizer tube 30 to seal the opened furrow.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A knife applicator for a tillage implement to apply fertilizer into the ground, comprising:
    an upper mounting portion adapted for mounting on a shank member of said tillage implement to be removable therefrom;
    a lower furrow making portion including:
        a lower leading edge having a rounded tip to glide through the ground beneath the surface thereof to lift soil upwardly and outwardly in the creation of a furrow;
        a generally vertical leading edge extending upwardly from said lower leading edge to said upper mounting portion; and
        a raised member on said generally vertical leading edge to provide further lifting of said soil; and
    a fertilizer tube positioned behind said upper mounting portion and terminating at an end positioned above said lower leading edge to place fertilizer into the ground behind said lower leading edge.

2. The knife applicator of claim 1 further comprising:
    a wedge member having wings positioned on opposing sides of said fertilizer tube to engage soil raised by said lower furrow making portion and forces said raised soil downwardly to seal said fertilizer within the soil.

3. The knife applicator of claim 2 wherein said lower leading edge extends rearwardly to terminate adjacent said end of said fertilizer tube to form a dirt shield preventing soil from entering into said end of said fertilizer tube.

4. The knife applicator of claim 1 wherein said lower leading edge extends rearwardly to terminate adjacent said end of said fertilizer tube to form a dirt shield preventing soil from entering into said end of said fertilizer tube.

5. A knife applicator for a tillage implement to apply fertilizer into the ground, comprising:
    an upper mounting portion adapted for mounting on a shank member of said tillage implement to be removable therefrom;
    a lower furrow making portion including:
        a lower leading edge having a rounded tip to glide through the ground beneath the surface thereof to lift soil upwardly and outwardly in the creation of a furrow; and
        a generally vertical leading edge extending upwardly from said lower leading edge to said upper mounting portion;
    a fertilizer tube positioned behind said upper mounting portion and terminating at an end positioned above said lower leading edge to place fertilizer into the ground behind said lower leading edge; and
    a wedge member having wings positioned on opposing sides of said fertilizer tube to engage soil raised by said lower furrow making portion and forces said raised soil downwardly to seal said fertilizer within the soil.

6. The knife applicator of claim 5 wherein said lower leading edge extends rearwardly to terminate adjacent said end of said fertilizer tube to form a dirt shield preventing soil from entering into said end of said fertilizer tube.

7. The knife applicator of claim 6 wherein said lower leading edge further comprises a raised member on said generally vertical leading edge to provide further lifting of said soil.

8. A knife applicator for a tillage implement to apply fertilizer into the ground, comprising:
    an upper mounting portion adapted for mounting on a shank member of said tillage implement to be removable therefrom;
    a lower furrow making portion including:
        a lower leading edge having a rounded tip to glide through the ground beneath the surface thereof to lift soil upwardly and outwardly in the creation of a furrow; and
        a generally vertical leading edge extending upwardly from said lower leading edge to said upper mounting portion; and
    a fertilizer tube positioned behind said upper mounting portion and terminating at an end positioned above said lower leading edge to place fertilizer into the ground behind said lower leading edge, said lower leading edge extending rearwardly to terminate adjacent said end of said fertilizer tube to form a dirt shield preventing soil from entering into said end of said fertilizer tube.

9. The knife applicator of claim 8 further comprising:
    a wedge member having wings positioned on opposing sides of said fertilizer tube to engage soil raised by said lower furrow making portion and forces said raised soil downwardly to seal said fertilizer within the soil.

10. The knife applicator of claim 9 wherein said lower leading edge further comprises a raised member on said generally vertical leading edge to provide further lifting of said soil.

11. A knife applicator for a tillage implement to apply fertilizer into the ground, the applicator comprising:
    an upper mounting portion adapted for mounting on a shank member of said tillage implement, the upper mounting portion including a lower forward end;
    a tip member secured to the lower forward end of the mounting portion and forming a convex upwardly facing surface that begins at a rounded lower leading edge tip and slopes upward toward the mounting portion; and
    a fertilizer tube positioned behind the upper mounting portion and terminating at an end positioned above the lower leading edge to place fertilizer into the ground behind the lower leading edge.

12. The apparatus of claim 11 wherein the tip member further includes a dirt shield that extends rearward from the rounded tip along the lower end of the mounting portion terminating adjacent the fertilizer tube end.

13. The apparatus of claim 12 wherein the dirt shield terminates below the fertilizer tube end.

14. The apparatus of claim 13 wherein the fertilizer tube end opens essentially downward and the end opening faces the dirt shield.

15. The apparatus of claim 11 wherein the tip member further includes an upward sloping portion that slopes upward from an end of the upwardly facing surface opposite the rounded tip to a greater degree than the rounded tip slopes upward.

16. The apparatus of claim 15 wherein the upward sloping portion forms a flat surface facing the same direction as the rounded tip.

17. The apparatus of claim 16 wherein the upwardly facing surface includes a rear portion proximate the upward sloping portion and the tip member further includes a raised member that extends upward from the rear portion of the upwardly facing surface and slopes rearward away from the rounded tip and toward the upward sloping portion.

18. The apparatus of claim 17 wherein the raised member is narrower in width than the rounded tip.

19. The apparatus of claim 11 wherein the upwardly facing surface includes a rear portion proximate the end of the tip member opposite the rounded tip and the tip member further includes a raised member that extends upward from the rear portion of the upwardly facing surface and slopes rearward away from the rounded tip to a greater degree than the rounded tip slopes upwardly.

20. The apparatus of claim 19 wherein the raised member is narrower in width than the rounded tip.

\* \* \* \* \*